United States Patent
Kim et al.

(10) Patent No.: US 11,219,287 B1
(45) Date of Patent: *Jan. 11, 2022

(54) EYEWEAR DEVICE CHARGING CASE

(71) Applicant: Snap Inc., Santa Monica, CA (US)

(72) Inventors: Jinwoo Kim, Los Angeles, CA (US);
Jun Lin, Sherman Oaks, CA (US)

(73) Assignee: Snap Inc., Santa Monica, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 16/115,273

(22) Filed: Aug. 28, 2018

Related U.S. Application Data

(60) Provisional application No. 62/551,039, filed on Aug. 28, 2017, provisional application No. 62/647,064, filed on Mar. 23, 2018.

(51) Int. Cl.
| | |
|---|---|
| *H02J 50/10* | (2016.01) |
| *A45C 11/04* | (2006.01) |
| *H02J 50/70* | (2016.01) |
| *G06F 1/16* | (2006.01) |
| *H01M 50/20* | (2021.01) |

(52) U.S. Cl.
CPC ............ *A45C 11/04* (2013.01); *H02J 50/10* (2016.02); *H02J 50/70* (2016.02); *A45F 2200/0541* (2013.01); *G06F 1/1632* (2013.01); *H01M 50/20* (2021.01)

(58) Field of Classification Search
CPC .................................................. H02J 7/0042
USPC ......................................................... 320/114
See application file for complete search history.

(56) References Cited

U.S. PATENT DOCUMENTS

| | | | |
|---|---|---|---|
| 2,794,085 | A | 5/1957 | Angelis |
| 4,456,346 | A | 6/1984 | Beyer |
| 5,258,784 | A | 11/1993 | Baines |
| 5,606,743 | A | 2/1997 | Vogt et al. |
| 5,900,720 | A | 5/1999 | Kallman et al. |

(Continued)

FOREIGN PATENT DOCUMENTS

| | | |
|---|---|---|
| CA | 2887596 A1 | 7/2015 |
| EP | 2596716 | 5/2013 |

(Continued)

OTHER PUBLICATIONS

"U.S. Appl. No. 16/115,286, Examiner Interview Summary dated Jul. 20, 2020", 3 pgs.

(Continued)

*Primary Examiner* — Edward Tso
*Assistant Examiner* — Ahmed H Omar
(74) *Attorney, Agent, or Firm* — Schwegman Lundberg & Woessner, P.A.

(57) ABSTRACT

A carry case for an electronics-enabled eyewear device, such as smart glasses, has charging contacts that are movable relative to a storage chamber in which the eyewear device is receivable. The charging contacts are connected to a battery carried by the case for charging the eyewear device via contact coupling of the charging contacts to corresponding contact formations on an exterior of the eyewear device. The charging contacts are in some instances mounted on respective flexible walls defining opposite extremities of the storage chamber. The contact formations on the eyewear device are in some instances provided by hinge assemblies that couple respective temples to a frame of the eyewear device.

17 Claims, 6 Drawing Sheets

(56) References Cited

U.S. PATENT DOCUMENTS

| | | | |
|---|---|---|---|
| 6,038,295 | A | 3/2000 | Mattes |
| 6,091,546 | A | 7/2000 | Spitzer |
| 6,854,845 | B1 | 2/2005 | Goldman et al. |
| 6,980,909 | B2 | 12/2005 | Root et al. |
| 7,173,651 | B1 | 2/2007 | Knowles |
| 7,411,493 | B2 | 8/2008 | Smith |
| 7,470,023 | B2 | 12/2008 | Glinert |
| 7,535,890 | B2 | 5/2009 | Rojas |
| 7,677,723 | B2 | 3/2010 | Howell et al. |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,432,124 | B2 * | 4/2013 | Foster ............... A45C 11/00 320/101 |
| 8,678,581 | B2 | 3/2014 | Blum |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,979,259 | B2 | 3/2015 | Haddock et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,443,227 | B2 | 9/2016 | Evans et al. |
| 9,482,882 | B1 | 11/2016 | Hanover et al. |
| 9,482,883 | B1 * | 11/2016 | Meisenholder ...... G02C 5/2272 |
| 9,489,661 | B2 | 11/2016 | Evans et al. |
| 9,491,134 | B2 | 11/2016 | Rosen et al. |
| 9,726,904 | B1 | 8/2017 | Lin |
| 9,952,452 | B1 | 4/2018 | Hanover et al. |
| 10,514,559 | B1 | 12/2019 | Meisenholder |
| 10,591,745 | B1 | 3/2020 | Lin |
| 10,670,889 | B1 | 6/2020 | Hanover et al. |
| 10,993,515 | B1 | 5/2021 | Kim et al. |
| 2005/0242771 | A1 * | 11/2005 | Blum ............... G02C 7/101 320/114 |
| 2007/0132942 | A1 | 6/2007 | Zelazowski |
| 2008/0106694 | A1 | 5/2008 | Blum et al. |
| 2008/0129953 | A1 | 6/2008 | Blum et al. |
| 2009/0002626 | A1 | 1/2009 | Wakabayashi |
| 2009/0296044 | A1 | 12/2009 | Howell et al. |
| 2010/0294675 | A1 * | 11/2010 | Mangano ........... A45C 11/04 206/5 |
| 2011/0058141 | A1 | 3/2011 | Cozzani |
| 2011/0202598 | A1 | 8/2011 | Evans et al. |
| 2012/0155064 | A1 | 6/2012 | Waters |
| 2012/0176580 | A1 | 7/2012 | Sonsino |
| 2012/0020331 | A1 | 8/2012 | Pugh et al. |
| 2012/0209924 | A1 | 8/2012 | Evans et al. |
| 2012/0220234 | A1 | 8/2012 | Abreu |
| 2014/0305814 | A1 * | 10/2014 | Santarelli ........... A45C 11/04 206/38 |
| 2018/0090958 | A1 | 3/2018 | Steger et al. |
| 2018/0136491 | A1 | 5/2018 | Ashwood et al. |
| 2020/0241329 | A1 | 7/2020 | Hanover et al. |

FOREIGN PATENT DOCUMENTS

| | | |
|---|---|---|
| FR | 2114282 | 6/1972 |
| GB | 384198 | 12/1932 |
| WO | WO-2013103985 A2 | 7/2013 |

OTHER PUBLICATIONS

"U.S. Appl. No. 16/115,286, Non Final Office Action dated May 4, 2020", 14 pgs.

"U.S. Appl. No. 16/115,286, Response filed Aug. 4, 2020 to Non Final Office Action dated May 4, 2020", 13 pgs.

"U.S. Appl. No. 16/115,286, Final Office Action dated Sep. 14, 2020", 11 pgs.

"U.S. Appl. No. 16/115,286, Notice of Allowance dated Jan. 6, 2021", 7 pgs.

"U.S. Appl. No. 16/115,286, Response filed Dec. 14, 2020 to Final Office Action dated Sep. 14, 2020", 8 pgs.

"Amendment and Response to Non Final Office Action: U.S. Appl. No. 15/339,526, Response filed Jun. 13, 2017 to Non Final Office Action dated Mar. 13, 2017", 13 pgs.

"U.S. Appl. No. 14/687,308, Final Office Action dated Feb. 1, 2016", 12 pgs.

"U.S. Appl. No. 14/687,308, Non Final Office Action dated May 29, 2015", 9 pgs.

"U.S. Appl. No. 14/687,308, Notice of Allowance dated Aug. 3, 2016", 13 pgs.

"U.S. Appl. No. 14/687,308, Response filed Jun. 24, 2016 to Final Office Action dated Feb. 1, 2016", 18 pgs.

"U.S. Appl. No. 14/687,308, Response filed Oct. 28, 2015 to Non Final Office Action dated May 29, 2015", 20 pgs.

"U.S. Appl. No. 14/687,362, Non Final Office Action dated Jan. 6, 2016", 8 pgs.

"U.S. Appl. No. 14/687,362, Non Final Office Action dated May 29, 2015", 7 pgs.

"U.S. Appl. No. 14/687,362, Notice of Allowance dated Sep. 6, 2016", 7 pgs.

"U.S. Appl. No. 14/687,362, Response filed Jun. 3, 2016 to Non Final Office Action dated Jan. 6, 2016", 14 pgs.

"U.S. Appl. No. 14/687,362, Response filed Oct. 28, 2015 to Non Final Office Action dated May 29, 2015", 16 pgs.

"U.S. Appl. No. 14/869,149 Amendment and Response filed Mar. 16, 2017 to Non Final Office Action dated Dec. 5, 2016", 20 pgs.

"U.S. Appl. No. 14/869,149, Corrected Notice of Allowance dated Apr. 17, 2017", 2 pgs.

"U.S. Appl. No. 14/869,149, Non Final Office Action dated Dec. 5, 2016", 14 pgs.

"U.S. Appl. No. 14/869,149, Notice of Allowance dated Mar. 24, 2017", 7 pgs.

"U.S. Appl. No. 14/869,149, PTO Response to Rule 312 Communication dated Jun. 29, 2017", 2 pgs.

"U.S. Appl. No. 15/339,526, Final Office Action dated Sep. 14, 2017", 11 pgs.

"U.S. Appl. No. 15/339,526, Non Final Office Action dated Mar. 13, 2017", 6 pgs.

"U.S. Appl. No. 15/339,526, Notice of Allowance dated Dec. 11, 2017", 18 pgs.

"U.S. Appl. No. 15/339,526, Response filed Nov. 13, 2017 to Final Office Action dated Sep. 14, 2017", 8 pgs.

"U.S. Appl. No. 15/339,537, Advisory Action dated Feb. 5, 2018", 3 pgs.

"U.S. Appl. No. 15/339,537, Advisory Action dated Jun. 26, 2019", 3 pgs.

"U.S. Appl. No. 15/339,537, Corrected Notice of Allowability dated Nov. 13, 2019", 2 pgs.

"U.S. Appl. No. 15/339,537, Final Office Action dated Mar. 22, 2019", 13 pgs.

"U.S. Appl. No. 15/339,537, Final Office Action dated Nov. 17, 2017", 13 pgs.

"U.S. Appl. No. 15/339,537, Non Final Office Action dated Mar. 14, 2017", 5 pgs.

"U.S. Appl. No. 15/339,537, Non Final Office Action dated Aug. 10, 2018", 13 pgs.

"U.S. Appl. No. 15/339,537, Notice of Allowance dated Aug. 26, 2019", 7 pgs.

"U.S. Appl. No. 15/339,537, Response filed Jan. 17, 2018 to Final Office Action dated Nov. 17, 2017", 12 pgs.

"U.S. Appl. No. 15/339,537, Response filed May 20, 2019 to Final Office Action dated Mar. 22, 2019", 14 pgs.

"U.S. Appl. No. 15/339,537, Response filed Jul. 18, 2017 to Non Final Office Action dated Mar. 14, 2017", 11 pgs.

"U.S. Appl. No. 15/339,537, Response filed Nov. 8, 2018 to Non Final Office Action dated Aug. 10, 2018", 16 pgs.

"U.S. Appl. No. 15/642,878, Non Final Office Action dated Sep. 18, 2017", 12 pgs.

(56) References Cited

OTHER PUBLICATIONS

"U.S. Appl. No. 15/642,878, Notice of Allowance dated Jan. 22, 2018", 11 pgs.
"U.S. Appl. No. 15/642,878, Response filed Dec. 8, 2017 to Non Final Office Action dated Sep. 18, 2017", 17 pages.
"U.S. Appl. No. 15/892,610, Non Final Office Action dated Sep. 13, 2019", 11 pgs.
"U.S. Appl. No. 15/892,610, Notice of Allowance dated Jan. 24, 2020", 8 pgs.
"U.S. Appl. No. 15/892,610, Response filed Dec. 12, 2019 to Non Final Office Action dated Sep. 13, 2019", 10 pgs.
"U.S. Appl. No. 15/892,610, Response filed Jun. 21, 2019 to Restriction Requirement dated Apr. 25, 2019", 7 pgs.
"U.S. Appl. No. 15/892,610, Restriction Requirement dated Apr. 25, 2019", 6 pgs.
"U.S. Appl. No. 15/949,852, Non Final Office Action dated Jul. 25, 2019", 5 pgs.
"U.S. Appl. No. 15/949,852, Notice of Allowance dated Nov. 6, 2019", 7 pgs.
"U.S. Appl. No. 15/949,852, Response filed Oct. 24, 2019 to Non-Final Office Action dated Jul. 25, 2019", 8 pgs.
"U.S. Appl. No. 16/790,971, Non Final Office Action dated Apr. 19, 2021", 11 pgs.
"U.S. Appl. No. 16/790,971, Preliminary Amendment filed Mar. 30, 2020", 6 pgs.
"U.S. Appl. No. 17/301,738, Preliminary Amendment filed Jun. 17, 2021", 8 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
U.S. Appl. No. 14/687,308 U.S. Pat. No. 9,482,882, filed Apr. 15, 2015, Eyewear Having Selectively Exposable Feature.
U.S. Appl. No. 15/339,526 U.S. Pat. No. 9,952,452, filed Oct. 31, 2016, Eyewear Having Selectively Exposable Feature.
U.S. Appl. No. 15/892,610 U.S. Pat. No. 10,670,889, filed Feb. 9, 2018, Eyewear Having Selectively Exposable Feature.
U.S. Appl. No. 16/853,501, filed Apr. 20, 2020, Eyewear Having Selectively Exposable Feature.
U.S. Appl. No. 14/687,362 U.S. Pat. No. 9,482,883, filed Apr. 15, 2015, Eyewear Having Linkage Assembly Between a Temple and a Frame.
U.S. Appl. No. 16/696,499, filed Nov. 26, 2019, Eyewear Having a Linkage Assembly Between a Temple and a Frame.
U.S. Appl. No. 15/339,537 U.S. Pat. No. 10,514,559, filed Oct. 31, 2016, Eyewear Having Linkage Assembly Between a Temple and a Frame.
U.S. Appl. No. 14/869,149 U.S. Pat. No. 9,726,904, filed Sep. 29, 2015, Eyewear with Conductive Temple Joint.
U.S. Appl. No. 15/642,878 U.S. Pat. No. 9,971,169, filed Jul. 6, 2017, Eyewear with Conductive Temple Joint.
U.S. Appl. No. 15/949,852 U.S. Pat. No. 10,591,745, filed Apr. 10, 2018, Eyewear with Conductive Temple Joint.
U.S. Appl. No. 16/790,971, filed Feb. 14, 2020, Eyewear with Conductive Temple Joint.
U.S. Appl. No. 17/301,738, filed Apr. 13, 2021, Carry Case for Rechargeable Eyewear Devices.
"U.S. Appl. No. 16/790,971, Response filed Jul. 14, 2021 to Non Final Office Action dated Apr. 19, 2021", 12 pgs.
"U.S. Appl. No. 16/790,971, Notice of Allowance dated Jul. 27, 2021", 5 pgs.
"U.S. Appl. No. 16/790,971, Corrected Notice of Allowability dated Aug. 9, 2021", 2 pgs.
U.S. Appl. No. 16/115,286, filed Aug. 28, 2018, Carry Case for Rechargeable Eyewear Devices.

* cited by examiner

EYEWEAR DEVICE CHARGING CASE

PRIORITY CLAIM

This application claims the benefit of priority of U.S. Provisional Application Ser. No. 62/551,039, filed on Aug. 28, 2017; this application also claims the benefit of priority of U.S. Provisional Application Ser. No. 62/647,064, filed Mar. 23, 2018, which are hereby incorporated by reference herein in their entirety.

TECHNICAL FIELD

The subject matter disclosed herein relates generally to electronics-enabled eyewear, to holders for such eyewear, and to methods, apparatuses, systems, and devices for charging onboard electronic components of such eyewear.

BACKGROUND

Electronics-enabled eyewear devices, such as smart glasses, typically have integrated electronics requiring an onboard power supply in the form of a battery. Such batteries are usually relatively small and require regular recharging. Regular connection to a charging out for these purposes, however, can reduce user satisfaction with such devices.

Some recently introduced eyewear device holders or carry cases are multifunctional in that they not only stow the glasses for safe transportation, but at the same time serve as a docking station for charging of the smart glasses battery. Establishing a charging connection between the case and the eyewear device, however, can be problematic in that precise location of the eyewear device during insertion is required to achieve positive connection of conventional male-female type charging connectors (e.g., mini USB or iPhone connectors).

BRIEF DESCRIPTION OF THE DRAWINGS

Various ones of the appended drawings merely illustrate example embodiments of the present disclosure and cannot be considered as limiting its scope. To facilitate collation of numbered items in the description to the drawings, the first digit of each numbered item corresponds to the figure in which that item first appears. In the drawings.

Figure 1:
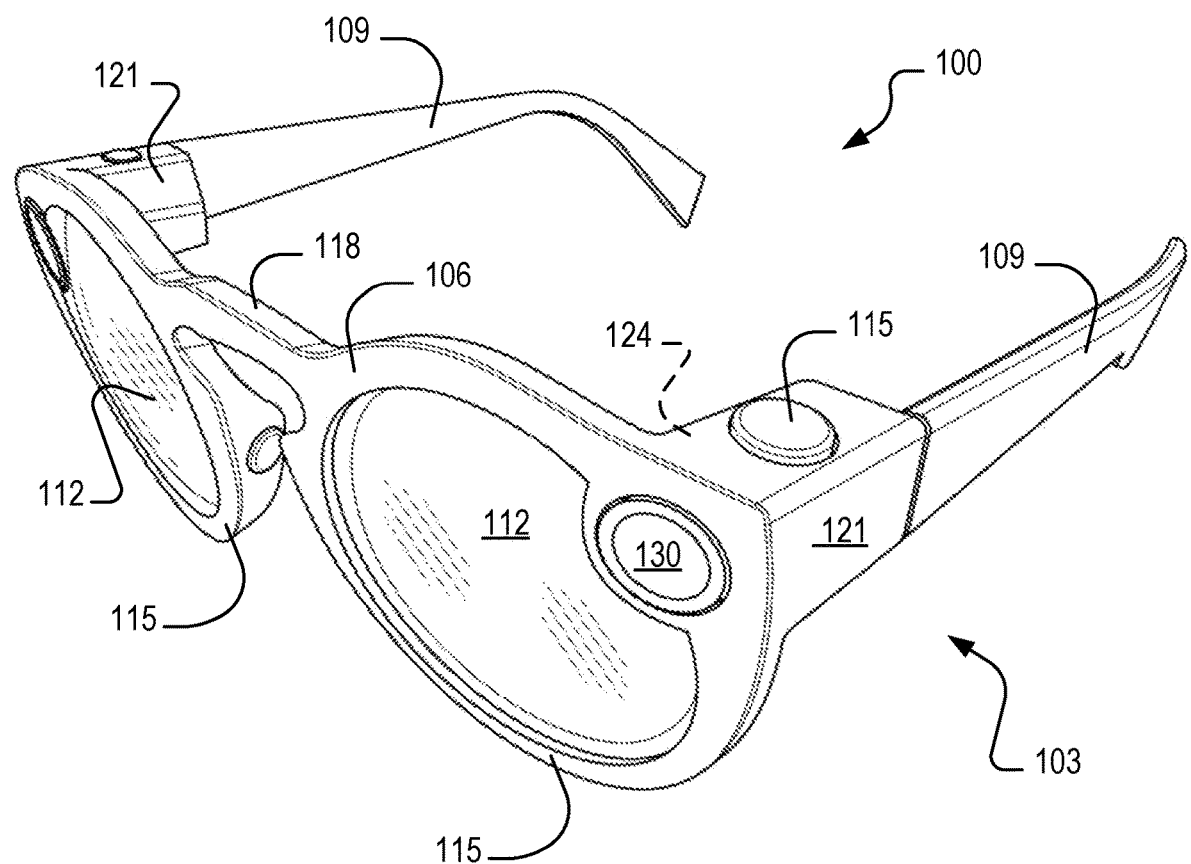
FIG. 1 is a schematic of three-dimensional view of an electronics-enabled eyewear device in the form of a pair of smart glasses, according to an example embodiment.

The headings provided herein are merely for convenience and do not necessarily affect the scope or meaning of the terms used.

Overview

One aspect of the disclosure provides a carry case for an electronics-enabled eyewear device, the case having at least one charging contact that is movable relative to a storage cavity or chamber in which the eyewear device is receivable, the charging contact being connected to a battery carried by the case for charging the eyewear device via contact coupling of the charging contact to a corresponding contact formation on an exterior of the eyewear device.

Contact coupling, contact charging, and associated terms related to contact engagement between two components mean engagement between the components in which electricity transfer occurs via surfaces in contact with one another, without a formation of one of the components being received in a complementary formation in the other component. Thus, contact coupling is to be distinguished from male/female or spigot/socket couplings.

Both the charging contact of the case and the contact formation of the eyewear device can be of a metal material. In some embodiments, a magnetic element may be provided on at least one of the charging contact and the contact formation, to facilitate contact engagement by magnetic action. In some embodiments, each charging contact comprises a magnet with an electrically conductive outer surface, for example provided by a metal plating or coating.

One aspect of the disclosure thus provides a case for an electronics-enabled eyewear device (e.g., smart glasses), the case comprising:

a body that defines a storage chamber for holding the eyewear device;

a power arrangement (e.g., a battery) configured to provide electrical power for charging an onboard battery of the eyewear device while the eyewear device is held in the storage chamber;

a flexible wall (e.g., a wall of flexible sheet material) that forms part of the case body and that at least partially defines the storage chamber; and a charging contact mounted on the flexible wall for engagement with a complementary contact formation on the eyewear device, the charging contact being conductively connected to the power arrangement to enable charging of the eyewear device via the charging contact.

Another aspect of the disclosure provides for a kit comprising an eyewear device and a complementary case such as that described above. Yet a further aspect of the disclosure provides for an eyewear device configured for recharging of an onboard battery via contact coupling with an external power source via contact formations exposed on an exterior of the eyewear device. In some embodiments, the eyewear device comprises:

a body comprising a frame configured to hold one or more optical elements (e.g., lenses), and a pair of temples connected to the frame to be hingedly movable between a wearable mode and a collapsed mode;

on-board electronics housed by the body and including a rechargeable onboard battery;

charging circuitry connected to the onboard battery to enable charging of the onboard battery responsive to coupling of the charging circuitry to an external power source; and one or more contact formations conductively connected to the charging circuitry for coupling the charging circuitry to an external power source by contact engagement with one or more corresponding charging contacts, each contact formation being exposed on an exterior of the body when the pair of temples are in the collapsed mode.

In some embodiments, the contact formations of the eyewear device are inaccessible from the exterior of the device when the eyewear device is in the collapsed mode, being exposed for contact coupling when the eyewear device is disposed to the collapsed mode. In one such embodiment, the contact formations are provided by a pair of hinge assemblies providing articulated coupling of the respective temples to the frame.

In some embodiments, the case comprises a pair of charging contacts mounted on respective flexible walls at opposite extremities of the storage chamber. The charging contact in some embodiments comprises a metal tab or detail piece located on a flexible end wall that abuts or is proximate to a corresponding lateral extremity of the eyewear device when it is placed in the storage chamber.

In some embodiments, the power arrangement comprises a battery housed by the case body, the charging contacts being connected to the power arrangement such as to have opposite polarities during charging of the eyewear device. The battery is in some embodiments connected by respective conductive paths to the charging contacts such as to form an interrupted charging circuit that is closable by insertion of the eyewear device in the storage chamber. When thus inserted in the storage chamber in a charging configuration, each charging contact of the case is coupled with a respective contact formation (e.g., the respective hinges) on the eyewear device at opposite lateral ends thereof.

Instead, or in addition, the power arrangement in some embodiments comprises a charging port housed by the body for connection to an external power source. In some such embodiments, the charging port is conductively coupled to the charging contact to enable charging of the onboard battery of the eyewear device by the external power source. In some such embodiments, the case has no battery and charging is exclusively by means of external power. In other embodiments, however, the charging port is conductively coupled to the battery of the case such as to enable charging of the battery by the external power source via the charging port.

As mentioned, the contact formations of the eyewear device are in some embodiments provided by a pair of hinge assemblies connecting respective temples of the eyewear device to a frame thereof, each charging contact being positioned such as to be in register with a corresponding one of the pair of hinge assemblies when the eyewear device is stored in the storage chamber in the collapsed mode.

In some embodiments, the case body comprises a pair of the opposed rigid sidewalls, with a pair of flexible walls extending transversely between the sidewalls at opposite ends of the body. The flexible walls thus define end walls closing off opposite ends of the storage chamber, each of the flexible end walls having mounted thereon a respective charging contact. In some embodiments, the flexible end walls are of a conductive fabric material, each flexible end wall defining at least part of an electrically conductive path connecting the respective charging contacts with the power arrangement.

In some embodiment, each charging contact includes a magnetic element positioned for magnetic attachment to the contact formation of the eyewear device. As mentioned, the charging contacts are in some embodiments of composite construction, comprising a core magnet with an electrically conductive metal coating or plating layer providing an outer surface of the charging contact. Any suitable metal coating or plating may be applied. Instead, or in addition, each of the contact formations of the eyewear device may include a magnetic element to facilitate contact engagement through magnetic attractive action. In some embodiments, each contact formation of the eyewear device may comprise a magnet having a metallic plating or coating. In such embodiments, the target component of the magnetic element (i.e., the contact formations of the eyewear device in cases where the charging contacts are magnetic, or vice versa) may be of a ferromagnetic material. In other embodiments, both the charging contacts of the case and the contact formations of the eyewear device may comprise magnetic elements with electrically conductive contact surfaces.

DETAILED DESCRIPTION

The description that follows includes devices, systems, methods, techniques, instruction sequences, and computing machine program products that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

Various aspects of the disclosure will now be described in greater detail with reference to a specific example embodiment in the form of a smart glasses kit 300 (FIG. 3) that includes an eyewear device 100 (FIG. 1) and a complementary case 200 (FIG. 2) configured to enable charging of the eyewear device 100, when received in the case, by contact engagement of a pair of charging contacts on respective flexible walls forming part of the case.

FIG. 1 shows a front perspective view of an eyewear device in the form of a pair of smart glasses 100 that is shaped and configured for reception in the complementary case 200 (FIG. 2) such as to enable charging of onboard electronics forming part of the glasses 100. The glasses 100 include a body 103 comprising a front piece or frame 106 and a pair of temples 109 connected to the frame 106 for supporting the frame 106 in position on a user's face when the glasses 100 are worn. The frame 106 can be made from any suitable material such as plastics or metal, including any suitable shape memory alloy.

The glasses 100 of a pair of optical elements in the form of a pair of lenses 112 held by corresponding optical element holders in the form of a pair of rims 115 forming part of the frame 106. The rims 115 are connected by a bridge 118. In other embodiments, of one or both of the optical elements can be a display, a display assembly, or a lens and display combination, for example to provide an augmented reality display device.

The frame 106 includes a pair of end pieces 121 defining lateral end portions of the frame 106. In this example, a variety of electronics components are housed in one or both of the end pieces 121, as discussed in more detail below. In some embodiments, the frame 106 is formed of a single piece of material, so as to have a unitary or monolithic construction. In some embodiments, the whole of the body 103 (including both the frame 106 and the temples 109) can be of the unitary or monolithic construction.

The temples 109 are coupled to the respective end pieces 121. In this example, the temples 109 are coupled to the frame 106 by respective hinges so as to be hingedly movable between a wearable mode (as shown in FIG. 1) and a collapsed mode in which the temples 109 are pivoted towards the frame 106 to lie substantially flat against it (see, for example, FIGS. 3 and 4). In other embodiments, the temples 109 can be coupled to the frame 106 by any suitable means, provided that the glasses 100 in the collapsed mode provides one or more charging formations on its exterior for contact engagement with respective charging contacts on the case 200, as will be described below. Each of the temples 109 has a front portion of that is coupled to the frame 106 and has a rear portion for coupling to the ear of the user, such as the curved ends or ear piece illustrated in the example embodiment of FIG. 1.

The glasses 100 has onboard electronics 124 including a computing device, such as a computer, which can in different embodiments be of any suitable type so as to be carried by the body 103. In some embodiments, various components comprising the onboard electronics 124 are at least partially housed in one or both of the temples 109. In the present embodiment, various components of the onboard electronics 124 are housed in the lateral end pieces 121 of the frame 106. The onboard electronics 124 includes one or more processors with memory, wireless communication circuitry, and a power source (this example embodiment being a rechargeable battery, e.g. a lithium-ion battery). The onboard electronics 124 comprises low-power, high-speed circuitry, and, in some embodiments, a display processor. Various embodiments may include these elements in different configurations or integrated together in different ways.

As mentioned, the onboard electronics 124 includes a rechargeable battery. In some embodiments, the battery is disposed in one of the temples 109. In this example embodiment, however, the battery is housed in one of the end pieces 121, being electrically coupled to the remainder of the onboard electronics 124. The battery is further conductively connected to metal hinge pieces at both end pieces 121, to enable charging of the battery via the hinges. As will be described in greater detail with reference to FIGS. 3 and 4, hinge assemblies providing respective articulated connections between the temples 109 and the end pieces 121 are shaped and positioned such that when the glasses are in the collapsed mode (FIG. 3), at least one metal element of each hinge assembly is exposed on the exterior of the glasses 100 for contact connection to cooperating charging contacts 202.

The glasses 100 is camera-enabled, in this example comprising a camera 130 mounted in one of the end pieces 121 and facing forwards so as to be aligned more or less with the direction of view of a wearer of the glasses 100. The camera 130 is configured to capture digital photographic content as well as digital video content. Operation of the camera 130 is controlled by a camera controller provided by the onboard electronics 124, image data representative of images or video captured by the camera 130 being temporarily stored on a memory forming part of the onboard electronics 124. In some embodiments, the glasses 100 can have a pair of cameras 130, e.g. housed by the respective end pieces 121.

The glasses 100 further include one or more input and output devices permitting communication with and control of the camera 130. In particular, the glasses 100 include one or more input mechanisms for enabling user control of one or more functions of the glasses 100. In this embodiment, the input mechanism comprises a button 115 mounted on the frame 106 so as to be accessible on top of one of the end pieces 121 for pressing by the user.

Figure 2:
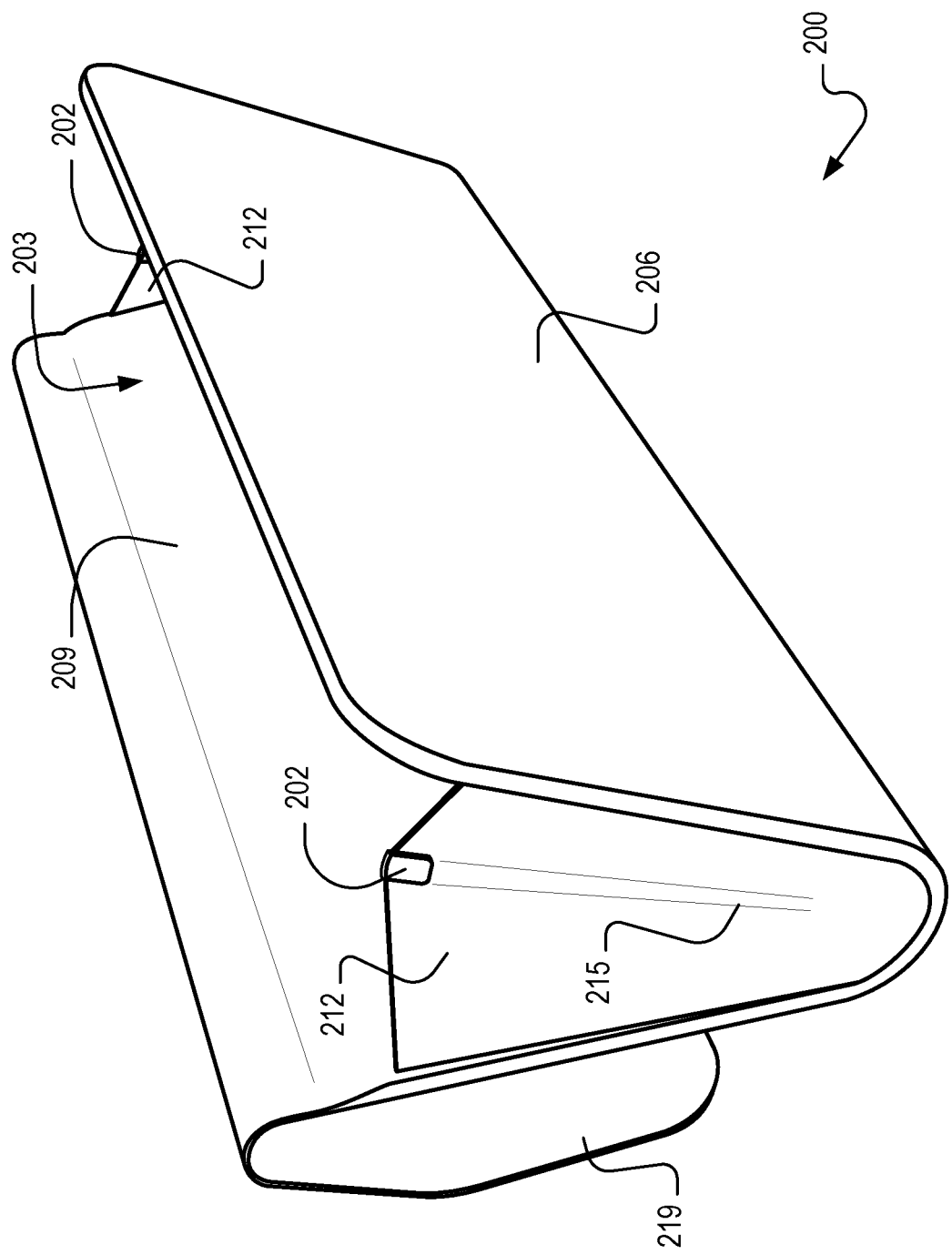
FIG. 2 is a three-dimensional oblique front view of a carry case for an eyewear device, according to an example embodiment.
Figure 3:
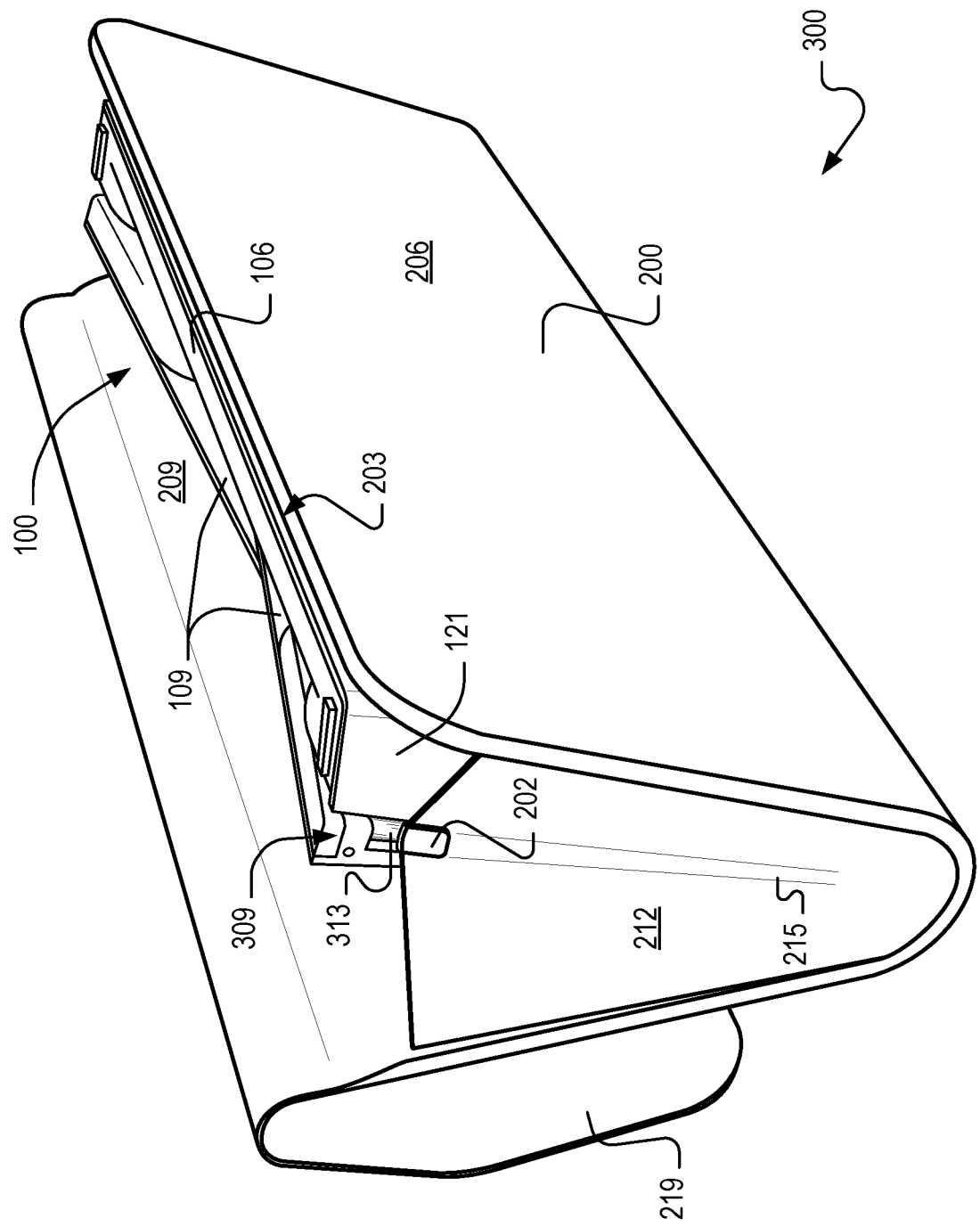
FIG. 3 is a three-dimensional oblique front view of a kit comprising an eyewear device and a complementary carry case, according to an example embodiment, the eyewear device being shown received in the carry case in a charging configuration in which metal charging contacts on flexible end walls of the carry case are in contact engagement with metal hinge pieces forming part of the eyewear device.
Figure 4:
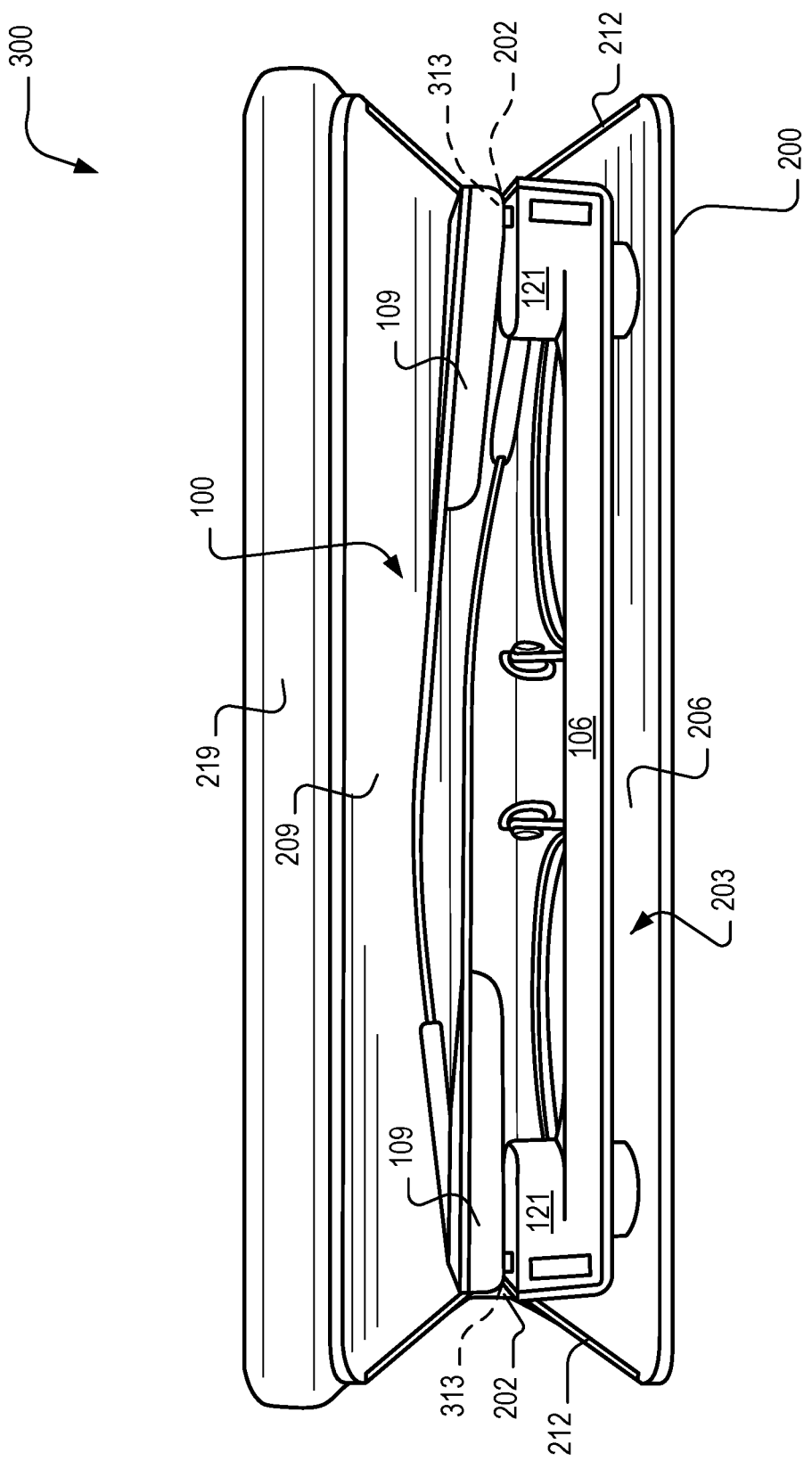
FIG. 4 is a three-dimensional top view of the kit of FIG. 3.

Turning now to FIG. 2, therein is shown a portable container in the form of a carry case 200 for holding and charging the smart glasses 100, according to an example embodiment. The case 200 has a body that defines a containing cavity in form of a storage chamber 203 shaped to receive and hold the glasses 100 in the collapsed mode (FIGS. 3 and 4). In this example embodiment, the chamber 203 is shaped such that the smart glasses 100 is receivable in the chamber 203 in either of two orientations in which an upper surface of the frame 106 is directed outwards from a mouth of chamber 203 (one of these orientations being shown in FIGS. 3 and 4).

The chamber 203 is in this example defined by two rigid sidewalls in the form of a generally rectangular front wall 206 and a corresponding rear wall 209 that is opposed to and transversely spaced from the front wall 206. Flexible end walls 212 extend transversely between the front wall 206 the rear wall 209 at opposite end edges thereof. In the condition shown in FIG. 2, the chamber 203 has an open mouth through which the smart glasses 100 can be inserted, after which a fold-over lid 219 can be moved to a closed position to enclose the glasses 100 in the case 200.

Note that, because the end walls 212 or flaps are flexible, the case 200 is a flexible container in that (by contraction or expansion of the end walls 212) the size of the chamber 203 is variable to at least some degree even when the case 200 is closed. In this example, the flexible end walls 212 are provided by a fabric material, but in other embodiments, the end walls 212 can be made of leather, flexible polymeric plastics sheet material, or any other suitable webbing material.

To enable hinged movement of the front wall 206 and the rear wall 209 relative to a common bottom edge at which they are connected, each end wall 212 has a preformed fold 215 that defines a line at which the respective end wall 212 folds inwards towards the chamber 203 responsive to movement of the front wall 206 and the rear wall 209 towards one another.

Each end wall 212 has mounted thereon a charging contact 202 in the form of a metal piece fastened to the flexible sheet material of the end wall 212 in a central position at a top edge of the end wall 212, coinciding with the preformed fold 215. The charging contact 202 thus correspond in position and physical function (e.g., facilitating folding of the flexible end wall 212) to analogous metal details often provided on similar end flaps on flexible cases for holding conventional non-smart glasses.

Figure 6:
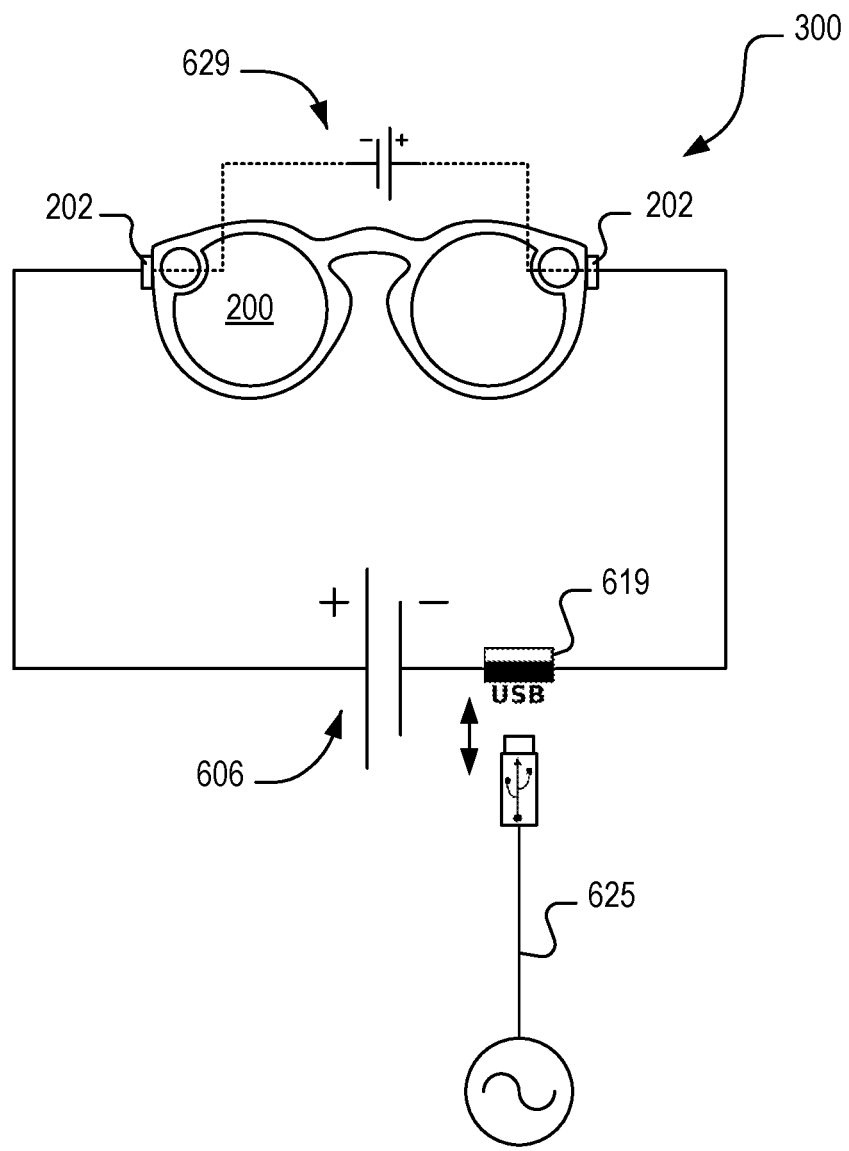
FIG. 6 is a highly simplified schematic circuit diagram showing charging circuitry forming part of a carry case and a complementary eyewear device, according to an example embodiment.

The contacts 202 in this example embodiment, however, perform the additional function of establishing a charging coupling with the glasses 100 when the glasses 100 are received in the chamber 203. To this end, each charging contact 202 is conductively connected to a power arrangement in the form of a portable battery 606 (FIG. 6).

In this example embodiment, the battery 606 is housed by the rear wall 209 of the case 200 such that no part of the battery 606 is exposed to the exterior of the case 200. The battery 606 is conductively coupled to both of the charging contacts 202 such that they have opposite polarities, as shown schematically in FIG. 6. In this example embodiment, each charging contact 202 is connected to the battery 606 by a respective conductive path that is formed at least in part by the fabric material of the corresponding end wall 212. To this end, each end wall 212 is in this example embodiment constructed from metalized conductive fabric material commercially available from Laird PLC. The remainder of each conductive path is formed by a flexible conductive cabling connected between the battery 606 and the respective end wall 212 and hidden below an outer leather covering layer of the case 200.

Figure 5:
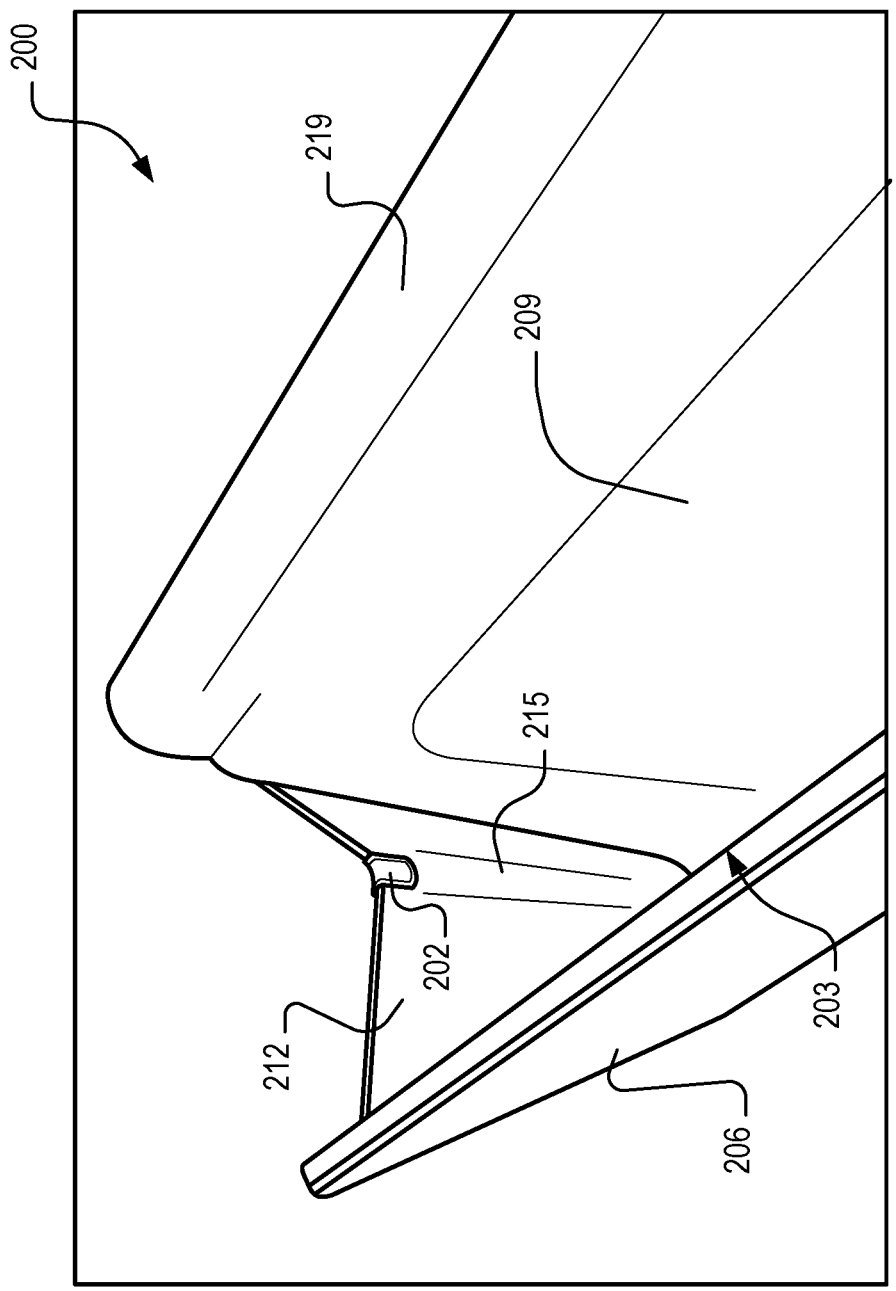
FIG. 5 is a three-dimensional view of an interior of the carry case of FIG. 2, according to an example embodiment.

In this example embodiment, each charging contact 202 is of composite construction, comprising a magnetic element for causing magnetic connection of the charging contact 202 to a metallic contact surface exposed on the exterior of the glasses 100 when they are in the collapsed mode (e.g., FIGS. 3 and 4), the charging contact 202 having an electrically conductive outer layer provided by a conductive metal coating deposited on the core magnetic element. In other embodiments, the charging contacts 202 may be of a ferromagnetic material (or may include a ferromagnetic element), while a magnetic element may be provided in association with the contact surface of the glasses 100 (e.g., an exposed portion of the hinge assemblies 309 are shown in FIG. 3). In one such example embodiment, a metal-plated magnet may be provided on the exterior of the glasses 100 to provide a contact formation for magnetically facilitated contact charging connection with respective charging contacts 202. As shown in FIG. 5, each charging contact 202 has an exposed metal contact surface on the inner surface of the end wall 212, facing towards the chamber 203.

Turning now to FIG. 3, therein is shown the kit 100 in a charging configuration, in which the glasses 100 are received and held in the storage chamber 203, with both charging contacts 202 being engaged with the glasses 100 to be in electrically conductive connection with the onboard electronics 124 in general and, in particular, the onboard battery of the glasses 100. As can be seen in FIG. 3, the charging contact surfaces of the glasses 100 are in this example embodiment provided by hinge assemblies 309 providing articulated connections between the respective temples 109 and their corresponding end pieces 121 on the frame 106 of the glasses 100.

In particular, the hinge assemblies 309 are shaped and positioned such that when the glasses 100 are in the collapsed mode, knuckles or loops 313 of the hinge assemblies 309 are exposed to the exterior of the glasses 100 and are located at the lateral extremities of the frame 106 (see, e.g., FIG. 4) for direct contact engagement access by the respective charging contacts 202. The contact formations of the glasses 100 are thus in this example embodiment provided by the hinge loops 313 of the glasses' hinge assemblies 309. The hinge loops 313 are moreover conductively connected to the onboard battery of the glasses 100, to enable recharging of the onboard battery via the contact connection at hinge assemblies 309 (see, in this regard, FIG. 6).

Moreover, as can most readily seen in FIG. 3, the charging contacts 202 on the end walls 212 of the case 200 are positioned such as to be more or less in register with the hinge assemblies 309 of the glasses 100, when the glasses 100 are located in the chamber 203 in an upright orientation in which an upper edge of the frame 106 is outermost. Note that the hinge assembly 309 is located more or less centrally in the width dimension of the chamber 203 (see, e.g., FIG. 4), so that the charging contact 202 would be in register with the hinge assembly 309 even if the orientation of the glasses 100 were reversed such that the frame 106 abuts against the rear wall 209 instead of against the front wall 206 (while maintaining the upright orientation of FIG. 3). As a result, insertion of the glasses 100 in the chamber 203 in either upright orientation results in virtually automatic contact engagement of the charging contacts 202 with the respective hinge assemblies 309, facilitated by magnetic interaction between them.

Certain aspects of a charging mechanism incorporated in the case 200 are shown in FIG. 6, which illustrates a highly simplified circuit diagram of the kit 100 during charging of the glasses 100. As discussed previously, the battery 606 of the case 200 is conductively coupled to both of the charging contacts 202. In this example embodiment, the battery 606, charging contact 202, and the conductive paths between them together form an interrupted charging circuit that can be completed by the glasses 100 via contact engagement of the respective hinge assemblies 309 with the corresponding charging contacts 202.

As shown schematically in FIG. 6 in broken lines, the onboard electronics 124 of the smart glasses 100 includes charging circuitry connecting both of the hinge assemblies 309 to the onboard battery 629 of the smart glasses 100. This internal charging circuitry is configured to cause charging of the onboard battery 629 when a voltage difference with the illustrated polarity is applied over the hinge assemblies 309.

As shown schematically in FIG. 6, the case battery 606 is connected to a charging port 619 incorporated in the case 200. The charging port 619 is in this example embodiment accessible via the exterior of the case 200, being located below the bottom edge of the case. The case 200 thus includes a charging circuit option for the case battery 606, in this example embodiment by connection to the mains power via a charging cable 625 removably connectable to the charging port 619. In some embodiments, the charging circuit of the case 200 is configured such that connection to mains power via the charging port 619 while the glasses 100 are connected to the charging circuit (such as in FIG. 6) results in charging of the onboard battery of the glasses 100 by mains power.

In use, the case 200 can be used for the dual purposes of storing the glasses 100 protectively and of charging the onboard battery of the glasses 100 while it is being stored. When the glasses 100 are to be stored in the case 200, the user simply folds the temples 109 on to the frame 106, and then inserts the glasses 100 into the storage chamber 203 in either of the possible upright orientations. When thus inserted, the charging contacts 202 are each in register with and closely spaced from the corresponding exposed hinge assemblies 309 of the glasses 100, by virtue of the physical configuration of the case 200 and the locations of the charging contacts 202 thereon.

In many instances, each charging contact 202 then automatically closes the gap between itself and the corresponding metal hinge assembly 309 and makes contact engagement therewith through attractive magnetic action of the magnetic element forming part of the charging contact 202. In instances where such automatic contact attachment does not occur, the user can really establish a charging connection by gently nudging or biasing the respective end wall 212 inwards until the corresponding charging contact 202 snaps into contact with the metal hinge loops 313 of the registering hinge assembly 309. Such ease of docking the glasses 100 in the case 200, and the relatively larger margins for error in establishing the contact connections, is achieved in part by location of the charging contacts 202 on flexible walls, so that the charging contact 202 effectively provides a floating contact relative to a rigid base provided by the body of the case 200.

When the glasses 100 are thus located in the case 200 in a charging configuration in which both charging contacts 202 are conductively coupled to the respective hinge assemblies 309, the onboard battery 629 of the glasses 100 is automatically recharged by the battery 606 of the case 200 (or, if the case 200 is connected to mains power by a charging cable 625, the glasses battery 629 is recharged by mains power).

Benefits of the disclosed techniques and mechanisms include that contact coupling between the case 200 and the smart glasses 100 avoids limitations on location freedom associated with conventional contact pin charging methods.

Thus, charging of the smart glasses 100 can be achieved simply by dropping the smart glasses 100 into the case 200 in either of the upright orientations discussed above.

Note that an eyewear device can be placed into the storage chamber 203 of the case such as that described with reference to drawing in four different orientations. In this example embodiment, two of these orientations provide for necessary alignment of the charging contact 202 with the protruding charging geometries of the smart glasses 100 (e.g., in the described example embodiments, the hinge assemblies 309), being those orientations in which an operatively upper surface of the smart glasses 100 is outermost. In some embodiments, the geometry of the storage chamber 203 may be such as to allow for proper reception of the smart glasses 100 in only in those orientations in which the charging contact 202 and the hinge assemblies 309 (or, in other embodiments, an analogous contact formation) are in register.

A further benefit of the example case 200 is that the charging contact 202 on the end walls 212 correspond to analogous metal details on existing carry cases for non-smart glasses, so that the charging facilities provided by the case 200 are nonintrusive and aesthetically pleasing.

Note that, in some embodiments, the charging contacts 202 can additionally provide the charging interface for connecting the battery 606 (FIG. 6) of the case 200 to external power. In such cases, the charging cable 625 is configured for contact engagement with the charging contacts 202. Instead or in addition, an additional metal contact pad can in some embodiments be provided on the exterior of the case 200 for contact coupling with the charging cable 625 to charge the case battery 606.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed, is:

1. A case for an electronics-enabled eyewear device, the case comprising:
   a body that defines a storage chamber for holding the eyewear device;
   a power arrangement configured to provide electrical power for charging an onboard battery of the eyewear device while the eyewear device is held in the storage chamber;
   a flexible wall that forms part of the case body and that at least partially defines the storage chamber; and
   a charging contact mounted on the flexible wall for engagement with a corresponding eyewear charging formation on the eyewear device, the charging contact being conductively connected to the power arrangement to enable charging of the eyewear device via the charging contact, the eyewear charging formation being provided by a corresponding one of a pair of hinge assemblies connecting respective temples of the eyewear device to a frame thereof, the charging contact on the flexible wall being positioned to be in register with the corresponding hinge assembly when the eyewear device is stored in the storage chamber in a collapsed mode.

2. The case of claim 1, wherein the case comprises a pair of charging contacts mounted on respective flexible walls at opposite lateral extremities of the storage chamber.

3. The case of claim 2, wherein:
   the power arrangement comprises a battery housed by the case body; and
   wherein the charging contacts are connected to the power arrangement such as to have opposite polarities during charging of the eyewear device.

4. The case of claim 3, wherein the battery is connected by respective conductive paths to the charging contacts such as to form an interrupted charging circuit that is closable by insertion of the eyewear device in the storage chamber such that each charging contact of the case is coupled with a respective eyewear charging formation on the eyewear device at opposite lateral ends thereof.

5. The case of claim 3, further comprising a charging port housed by the body for connection to an external power source, the charging port being conductively coupled to the battery of the case such as to enable charging of the battery by the external power source via the charging port.

6. The case of claim 2, wherein the case body comprises a pair of opposed rigid sidewalls, with a pair of flexible walls extending transversely between the sidewalls at opposite ends of the body, so that the flexible walls define end walls closing off opposite ends of the storage chamber, each of the flexible end walls having mounted thereon a respective charging contact.

7. The case of claim 6, wherein the flexible end walls are of a conductive fabric material, each flexible end wall defining at least part of an electrically conductive path connecting the respective charging contacts with the power arrangement.

8. The case of claim 1, wherein the charging contact includes a magnetic element positioned for magnetic attachment to the contact formation of the eyewear device.

9. A kit comprising
an eyewear device disposable between a wearable mode and a collapsed mode by hinged movement of a pair of temples on a lens-holding frame of the eyewear device, the eyewear device comprising:
onboard electronics;
an onboard battery connected to the onboard electronics for providing electrical power thereto; and
an eyewear charging formation conductively coupled to the onboard battery for enabling charging of the onboard battery by an external power source via connection to the eyewear charging formation; the eyewear charging formation being provided by one of a pair of hinge assemblies connecting respective temples of the eyewear device to a frame thereof, the hinge assembly being configured for external exposure when the eyewear device is in the collapsed mode, thereby to enable contact charge coupling via the hinge assembly; and
a portable case comprising:
a body that defines a storage chamber for holding the eyewear device in the collapsed mode;
a power source housed by the case body;
a flexible wall that forms part of the case body and that at least partially defines the storage chamber; and
a charging contact mounted on the flexible wall for contact engagement with the eyewear charging formation of the eyewear device when the eyewear device is held in the storage chamber, the charging contact being positioned on the flexible wall to be in register with the corresponding hinge assembly when the eyewear device is stored in the storage chamber in the collapsed mode, the charging contact being conductively connected to the power source to enable charging of the eyewear device via the charging contact.

10. The kit of claim 9, wherein:
the eyewear device has a pair of eyewear charging formations provided by the respective hinge assemblies conductively coupled to the onboard battery; and
the case has a corresponding pair of charging contacts mounted on respective flexible end walls defining opposite lateral extremities of the storage chamber.

11. The kit of claim 10, further comprising a magnetic attachment mechanism configured to establish physical engagement of each of the charging contacts of the case to the corresponding eyewear charging formation of the eyewear device by magnetic attractive action, movement of each charging contact laterally inwards to establish contact with the corresponding eyewear charging formation being enabled by movement of the flexible wall relative to the storage chamber.

12. The kit of claim 11, wherein the magnetic attachment mechanism comprises a respective magnetic element incorporated in each of the charging contacts of the case, each of the eyewear charging formations of the eyewear device being at least in part of a ferromagnetic metal.

13. The kit of claim 10, wherein the flexible end walls are of a conductive material, each flexible end wall defining at least part of an electrically conductive path connecting the respective charging contacts with the power source of the case.

14. The kit of claim 10, wherein the power source comprises a battery connected by respective conductive paths to the charging contacts such as to form an interrupted charging circuit that is closable by insertion of the eyewear device in the storage chamber such that each charging contact of the case is coupled with a respective eyewear charging formation on the eyewear device at opposite lateral ends thereof.

15. The kit of claim 10, wherein the case and the eyewear device are configured such that reception of the eyewear device in the storage chamber automatically brings each of the eyewear charging formations into register with the corresponding charging contact of the case.

16. The kit of claim 15, wherein the case and the eyewear device are configured such that reception of the eyewear device in the storage chamber in either of two different orientations automatically brings each of the eyewear charging formations into register with the corresponding charging contact of the case.

17. An eyewear device comprising:
a body comprising:
a frame configured to hold one or more optical elements; and
a pair of temples connected to the frame by respective hinge assemblies to be hingedly movable between a wearable mode and a collapsed mode;
on-board electronics housed by the body and including a rechargeable onboard battery;
charging circuitry connected to the onboard battery to enable charging of the onboard battery responsive to coupling of the charging circuitry to an external power source; and
one or more eyewear charging formations conductively connected to the charging circuitry for coupling the charging circuitry to an external power source by contact engagement with one or more corresponding charging contacts, at least one of the eyewear charging formations being provided by a corresponding one of the hinge assemblies, which hinge assembly is configured to be exposed on an exterior of the eyewear device when the pair of temples are in the collapsed mode.

* * * * *

UNITED STATES PATENT AND TRADEMARK OFFICE
CERTIFICATE OF CORRECTION

PATENT NO. : 11,219,287 B1  
APPLICATION NO. : 16/115273  
DATED : January 11, 2022  
INVENTOR(S) : Kim et al.

Page 1 of 1

It is certified that error appears in the above-identified patent and that said Letters Patent is hereby corrected as shown below:

On the Title Page

On page 2, in Column 1, item (56) under "U.S. Patent Documents", Line 52, delete "2012/0020331 A1" and insert --2012/0203310 A1-- therefor In the Claims In Column 11, Line 14, in Claim 9, after "comprising", insert --:--

In Column 11, Line 25, in Claim 9, delete "formation;" and insert --formation,-- therefor Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*